(12) United States Patent
Awadallah et al.

(10) Patent No.: US 7,617,203 B2
(45) Date of Patent: Nov. 10, 2009

(54) LISTINGS OPTIMIZATION USING A PLURALITY OF DATA SOURCES

(75) Inventors: Amr Awadallah, Palo Alto, CA (US); Timothy Roy Cadogan, Santa Clara, CA (US); Ali Diab, Atherton, CA (US); David A. Gerster, San Mateo, CA (US)

(73) Assignee: Yahoo! Inc, Sunnyvale, CA (US)

( * ) Notice: Subject to any disclaimer, the term of this patent is extended or adjusted under 35 U.S.C. 154(b) by 391 days.

(21) Appl. No.: 10/752,742

(22) Filed: Jan. 6, 2004

(65) Prior Publication Data

US 2005/0027699 A1 Feb. 3, 2005

Related U.S. Application Data

(60) Provisional application No. 60/492,018, filed on Aug. 1, 2003.

(51) Int. Cl.
*G06F 17/30* (2006.01)
(52) U.S. Cl. .......................................................... 707/5
(58) Field of Classification Search ........................ None
See application file for complete search history.

(56) References Cited

U.S. PATENT DOCUMENTS

| 5,724,521 | A | * | 3/1998 | Dedrick | 705/26 |
| 5,724,571 | A | * | 3/1998 | Woods | 707/5 |
| 5,752,238 | A | * | 5/1998 | Dedrick | 705/14 |
| 5,924,090 | A | * | 7/1999 | Krellenstein | 707/5 |
| 5,991,756 | A | | 11/1999 | Wu | |

(Continued)

FOREIGN PATENT DOCUMENTS

EP   1 282 051 A1   2/2003

(Continued)

OTHER PUBLICATIONS

Manmatha, R. and Sever, H. 2002. A Formal Approach to Score Normalization for Meta-search. HLT'02, Mar. 26, 2002, available online at: http://ciir.cs.umass.edu/pubfiles/ir-242.pdf.*

(Continued)

*Primary Examiner*—Neveen Abel Jalil
*Assistant Examiner*—Mark Andrew X Radtke
(74) *Attorney, Agent, or Firm*—Hickman Palermo Truong & Becker LLP

(57) ABSTRACT

A system is provided for allocating combinations of search results, types of space, and/or other information from different sources (e.g., search engines) in which a type of space, search results, and/or other information from at least one source or type or from each source or type, for example, are optimized to obtain an optimum commercial value. Using the example of a search, a commercial metric and a user satisfaction metric are established for search terms and used in the optimization process. In calculating the commercial value and the user satisfaction value for a set of search results, the weight given to the commercial value and the user satisfaction value of a search result is different depending on its source. Optionally, keeping the user satisfaction value above a certain threshold is treated as a constraint while optimizing the commercial value. Alternatively, a tradeoff may be allowed between the minimum threshold for the user satisfaction and a better commercial value. For example, a commercial value may be associated with the commercial metric and quality metric so that the total commercial value may be calculated and optimized.

32 Claims, 3 Drawing Sheets

U.S. PATENT DOCUMENTS

| | | | |
|---|---|---|---|
| 6,012,053 A * | 1/2000 | Pant et al. | 707/3 |
| 6,014,664 A * | 1/2000 | Fagin et al. | 707/5 |
| 6,078,866 A * | 6/2000 | Buck et al. | 702/2 |
| 6,128,623 A | 10/2000 | Mattis et al. | |
| 6,128,627 A | 10/2000 | Mattis et al. | |
| 6,209,003 B1 | 3/2001 | Mattis et al. | |
| 6,269,361 B1 * | 7/2001 | Davis et al. | 707/3 |
| 6,289,358 B1 | 9/2001 | Mattis et al. | |
| 6,292,880 B1 | 9/2001 | Mattis et al. | |
| 6,327,590 B1 * | 12/2001 | Chidlovskii et al. | 707/5 |
| 6,359,633 B1 | 3/2002 | Balasubramaniam et al. | |
| 6,360,215 B1 | 3/2002 | Judd et al. | |
| 6,385,602 B1 * | 5/2002 | Tso et al. | 707/3 |
| 6,421,675 B1 * | 7/2002 | Ryan et al. | 707/100 |
| 6,449,251 B1 | 9/2002 | Awadallah et al. | |
| 6,453,315 B1 * | 9/2002 | Weissman et al. | 707/5 |
| 6,453,319 B1 | 9/2002 | Mattis et al. | |
| 6,526,440 B1 * | 2/2003 | Bharat | 709/219 |
| 6,553,364 B1 | 4/2003 | Wu | |
| 6,564,208 B1 | 5/2003 | Littlefield et al. | |
| 6,580,786 B1 | 6/2003 | Yarlagadda | |
| 6,631,372 B1 | 10/2003 | Graham | |
| 6,647,383 B1 * | 11/2003 | August et al. | 707/3 |
| 6,665,837 B1 | 12/2003 | Dean et al. | |
| 6,675,161 B1 | 1/2004 | Suchter | |
| 6,691,112 B1 * | 2/2004 | Siegel et al. | 707/10 |
| 6,701,317 B1 | 3/2004 | Wiener et al. | |
| 6,704,727 B1 | 3/2004 | Kravets | |
| 6,711,567 B2 | 3/2004 | Littlefield et al. | |
| 6,795,820 B2 * | 9/2004 | Barnett | 707/3 |
| 6,799,176 B1 * | 9/2004 | Page | 707/5 |
| 6,826,572 B2 * | 11/2004 | Colace et al. | 707/10 |
| 6,868,389 B1 * | 3/2005 | Wilkins et al. | 705/10 |
| 6,873,982 B1 * | 3/2005 | Bates et al. | 707/5 |
| 6,910,192 B2 * | 6/2005 | McConaghy | 716/2 |
| 6,947,930 B2 * | 9/2005 | Anick et al. | 707/5 |
| 6,961,723 B2 * | 11/2005 | Faybishenko et al. | 707/3 |
| 6,973,436 B1 * | 12/2005 | Shkedi | 705/14 |
| 7,016,892 B1 * | 3/2006 | Kokkonen et al. | 707/3 |
| 7,058,516 B2 * | 6/2006 | Mascarenhas | 702/19 |
| 7,155,510 B1 * | 12/2006 | Kaplan | 709/224 |
| 7,181,438 B1 * | 2/2007 | Szabo | 707/2 |
| 7,188,106 B2 * | 3/2007 | Dwork et al. | 707/5 |
| 7,243,102 B1 * | 7/2007 | Naam et al. | 707/7 |
| 7,251,624 B1 * | 7/2007 | Lee et al. | 705/35 |
| 7,272,612 B2 * | 9/2007 | Birdwell et al. | 707/101 |
| 7,302,429 B1 * | 11/2007 | Wanker | 707/7 |
| 7,428,500 B1 * | 9/2008 | Linden | 705/26 |
| 2002/0046002 A1 * | 4/2002 | Tang et al. | 702/182 |
| 2002/0078025 A1 * | 6/2002 | Tanaka | 707/1 |
| 2002/0165860 A1 * | 11/2002 | Glover et al. | 707/5 |
| 2003/0036848 A1 * | 2/2003 | Sheha et al. | 701/209 |
| 2003/0050865 A1 * | 3/2003 | Dutta et al. | 705/27 |

FOREIGN PATENT DOCUMENTS

| | | |
|---|---|---|
| WO | WO 99/41694 A1 | 8/1999 |
| WO | WO 01/46780 A1 | 6/2001 |

OTHER PUBLICATIONS

Dreilinger, D. and Howe, A. E. 1997. Experiences with selecting search engines using metasearch. ACM Trans. Inf. Syst. 15, 3 (Jul. 1997), 195-222. DOI= http://doi.acm.org/10.1145/256163.256164.*

"Topix.net Weblog: The Secret Source of Google's Power" Available online at http://blog.topix.net/archives/000016.html posted Apr. 4, 2004, accessed Feb. 20, 2007.*

"Moore's Law—Wikipedia" Available online at http://en.wikipedia.org/wiki/Moore's_law last modified Feb. 19, 2007, accessed Feb. 20, 2007.*

Lebanon, G. and Lafferty, J. D. 2002. Cranking: Combining Rankings Using Conditional Probability Models on Permutations. In Proceedings of the Nineteenth international Conference on Machine Learning (Jul. 8-12, 2002). C. Sammut and A. G. Hoffmann, Eds. Morgan Kaufmann Publishers, San Francisco, CA, 363-370.*

International Searching Authorioty, Notification of Transmittal of The International Search Report and the Written Opinion of the International Searching Authority, or the Declaration, Nov. 23, 2004, pp. 1-14.

Current Claims of PCT/US2004/022553, pp. 1-7.

PCT International Bureau, "Notification Concerning Transmittal of International Preliminary Report on Patentability (Chapter 1 of the Patent Cooperation Treaty)," PCT/US2004/022553, Dated Feb. 16, 2006, 9 pages.

Google, "Google Search: flowers," 2004, http://www.google.com/search?hl=en&ie=UTF-8&q=flowers, data retrieved May 17, 2004, pp. 1-2.

* cited by examiner

LISTINGS OPTIMIZATION USING A PLURALITY OF DATA SOURCES

RELATED APPLICATIONS

This application claims priority benefit of U.S. Provisional Patent Application Ser. No. 60/492,018, filed Aug. 1, 2003, which is hereby incorporated by reference in its entirety.

FIELD OF THE INVENTION

The field of the invention is search engines in general, and more specifically relating to the generation of pages that contain search results.

BACKGROUND OF THE INVENTION

Search engines typically respond to searches by providing search results, which refer to collections of documents, listings of documents, or links to documents, that satisfy a user's specified search criteria. Similarly, the search results page refers to the web page including at least some search results. Typically, the documents that are identified in the listings are ranked according to their relevance to the search query. In addition to the conventional listing of ranked documents, some search engine result pages include a number of sponsored results that are related to the topic of the search query. The sponsored results are paid for by advertisers using a number of methods, and may include fees based on the number of clicks on and position of the sponsored result, as well as monthly or annual subscription fees. The sponsored results are often located in an area of the search results page that is distinct from the unsponsored search results and are not ranked using the same method or algorithm as the unsponsored results. For example, the sponsored result may be located at the very top of the search results page.

The listing of search results and the related sponsored results may come from different sources, such as different databases and/or different search engines. The number of sponsored results that are included in the search results page may vary according to how "commercial" the search query appears to be. For example, if a search query appears to be very commercial in nature (e.g., a search for "flowers and chocolates"), then the number of related sponsored results that are displayed may be six, while if the search query does not appear to be commercial in nature (e.g., a search for "Russia and revolution") the number of sponsored results that are displayed may be zero.

Commercial Metric

The measurement of how "commercial" search queries are is referred to herein as the "commercial metric" or "C-metric". The value of the C-metric for a given search query is referred to as the C-level of the search query. The C-level of a query reflects the degree to which the search query is deemed to be "commercial". Thus, the C-metric corresponds to a graph, while a C-level is a specific value, on the C-metric graph, that corresponds to a given set of inputs.

Various techniques may be used to establish the C-levels for search queries. For example, C-levels may be established by collecting a list of words that are likely to indicate that the user's search is commercial in nature. For example, a person entering a search query including the word "flowers" may very likely be looking to buy flowers. In contrast, a search query consisting of the word "elephant" is not likely to be commercial, because most people do not buy elephants. Once the set of "commercial-indicating" words has been established, the C-value for a given query may be established based on the presence or absence of commercial-indicating words in the query.

Using the presence of commercial-indicating words as the basis for establishing the C-level of queries is only one example of how C-levels may be established. The techniques described herein are not limited to any particular method of measuring the C-metric.

The Quality Metric

In some prior art systems, a quality metric (to be referred to as a Q-metric) is used as a measure of expected customer satisfaction (which may be referred to as an estimated customer satisfaction) with a set of search results. Although not used in the prior art, the Quality level (to be referred to as a Q-level) is the level of satisfaction that a given set of search results provides to the user. The Q-level is measured based on the Q-metric, and the Q-level is a quality or user satisfaction rating. In other words, the distinction between the Q-level and the Q-metric is that the Q-metric is a graph or a table of a mathematical function, while the Q-level is the value of the same function or a point on the graph or table represented by the Q-metric for a given set of inputs to the Q-metric. The Q-metric may be based on the Click-Through Ratio (CTR), which is the ratio of the number of people that click on a link (e.g., an advertising link) in the search results over the number of impressions of the page that contains that link. However, in the prior art, the Q-metric is based on the CTR of the unsponsored search results from a single, purely noncommercial search engine. CTRs may be measured against the CTR of the search results from a noncommercial search engine, using the noncommercial search engine as a standard to which the CTR of the commercial search engine is compared. For example, the CTR of a commercial search engine may be expressed as a percentage of a CTR of a reputable noncommercial search engine, such as perhaps Google, for example.

If too many sponsored results are provided, the user may become frustrated with the experience because it may obscure the search results that the user is interested in. Ultimately, the provider of the search engine would like to maximize its revenues, which may imply maximizing the number of sponsored results on the search result page, the total number of clicks on all sponsored results on all search result pages, the price per click of all or several of the sponsored results on a search result page, or any combination of the above. Consideration must be taken to ensure that the user experience of the search result pages is not adversely affected by the placement, the number, or the quality of the search results on the search results page, whether or not the search results are sponsored or unsponsored.

DETAILED DESCRIPTION OF EXAMPLES OF EMBODIMENTS OF THE INVENTION

Figure 1:
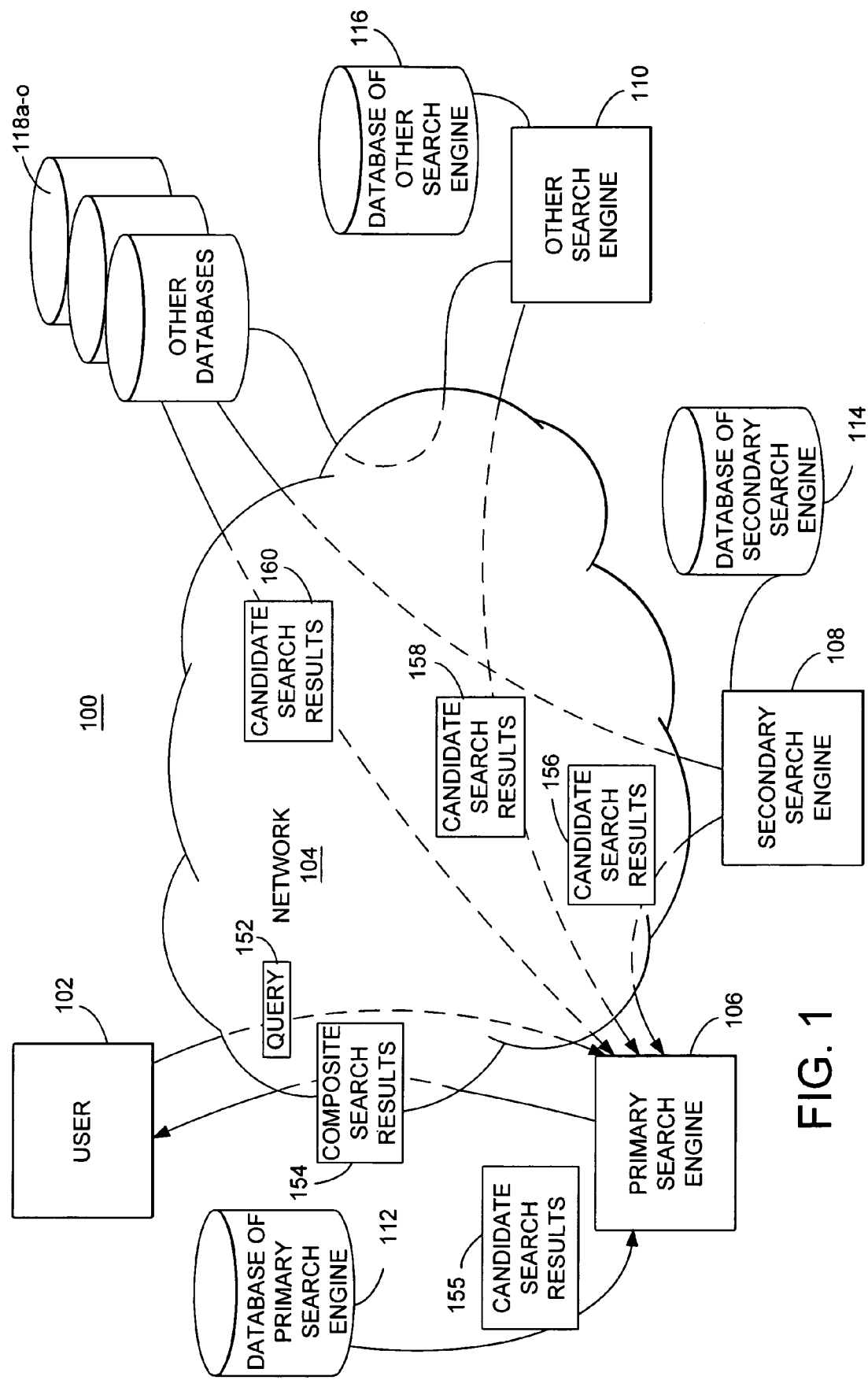
FIG. 1 shows a search system according the invention.

In the respective descriptions of each of FIGS. 1 and 2, all of the components are first listed by name and label number, and then afterwards described in greater detail in later paragraphs.

Overview

A system is provided including multiple embodiments that may be used independently of one another. Each embodiment represents an independent contribution to the art. Other independent embodiments and contributions to the art will be apparent to one of ordinary skill in the art from reading the entire specification. None of these embodiments are critical to any of the others.

In an embodiment, a search engine (which will be referred to as the primary search engine) provides composite search results to a user based on selections from search results from other search engines (which will be referred to as the secondary search engines). The search results from the secondary search engines are search result candidates for the primary search engine. The secondary search engines may be referred to as candidate sources, because they provide the search result candidates. In this context, a commercial search engine is a secondary search engine that provides sponsored search result candidates. A commercial search engine may be referred to as a sponsored search engine. A noncommercial search engine is one that provides search result candidates that are not sponsored. A noncommercial search engine may be referred to as an algorithmic search engine. The term algorithmic is used, because an algorithm (that does not account for sponsorship) is used to find the search results. Also, in this specification, the terms "sponsored" and "unsponsored" are generic to the presence of or lack of other types of sponsorship, respectively, where the nature of the sponsorship is not necessarily monetary payments. Additionally, although the terms "sponsored" and "unsponsored" are used to refer to resources such as search results, it should be understood that the distinction between "sponsored" and "unsponsored" search results or other resources may be whether they are based on user satisfaction or based on additional or other criteria. For example, anywhere sponsored search results or other resources are discussed, search results or other resources promoting a particular political agenda may be substituted for or mixed with other sponsored search results even though the search results promoting the political agenda are provided free of charge by (and in that sense are "sponsored by") the organization running the primary search engine. Thus, unless otherwise indicated, anywhere the words "unsponsored" or "nonsponsored" appear the word "algorithmic" or the phrase "based on user satisfaction" may be substituted. Similarly, anywhere the word "sponsored" appears the word "nonalgorithmic" or the phrase "not based only on user satisfaction" may be substituted.

The secondary search engines may be usable as primary search engines, and when used as a primary search engine may provide a mixture of sponsored and unsponsored search results. However, in this specification the secondary search engine is categorized as commercial or noncommercial depending upon whether the search candidates supplied to (or collected by) the primary search engine are commercial or noncommercial, which may be determined by whether the search results are sponsored or not sponsored, respectively. For example, Google may provide a mixture of sponsored and unsponsored search results to an ordinary user. However, if Yahoo! (a primary search engine) is using only the unsponsored search results of Google (a secondary search engine) as search results candidates, Google is still considered a noncommercial search engine.

In this specification, the term resource refers to any item supplied to a user for viewing. Similarly search results and search result candidates may include not only documents and links, but any resource or any item provided as an answer to a query. Thus, the term resources is generic to space on a web page, advertisements, the links that comprise the search results, documents, listings of documents, and the number of links displayable on a webpage, for example. Similarly, search results and a search result candidate may include any one of or any combination of space on a web page, advertisements, the links that comprise the search results, documents, listings of documents, and the number of links displayable on a webpage, for example. Thus, for example, since a search results page is a webpage displaying search results, and since search results do not necessarily include listings, in an extreme case, a search results page may only contain advertisements that were generated in response to a query.

In the context of this application the words optimum, optimized, optimal and other conjugations of the word optimum refer to finding a composition for a composite search result that is more desirable than other compositions. The optimum combination is not necessarily the best of all possible combinations, but is the best or approximately the best of those combinations tested and/or considered. Similarly, terms such as best and desirable may refer to being closest or closer to achieving a particular attribute value such as a commercial level. In particular, to optimize the C-level, the C-level is calculated for a number of different compositions of composite search results, and the composite search result having the C-level that is most desirable is called the optimum C-level. Thus, optimizing the C-level may mean finding the C-level that is highest for a set of possible compositions of composite search results.

In an embodiment, a Q-metric is defined to take into account, or is based on, composite search results from multiple candidate sources. The candidate sources may be of different types, such as commercial and noncommercial search engines. For example, the Q-metric may be established to be a weighted average of (1) the CTR associated with a commercial search engine and (2) the CTR associated with a noncommercial search engine. In an embodiment, a method is provided for determining user satisfaction, where a different weight is used to determine the Q-metric that is assigned to the same interaction depending on the part of the page that the user clicks on.

In an embodiment, the C-level of a search may be based, at least in part, on a probability that a word or term in the search query indicates that the search is commercial in nature. The Q-level and/or the C-level may be different for the same set of search result candidates, depending on the search query.

In an embodiment, the composition of the composite search results are chosen in a manner to achieve a combination of Q-level and C-level within a desired range of values. The range of values may be a set of values within a given tolerance of a maximum or minimum value, for example. The composition of the composite search results is the distribution or amount of search results selected from each search result candidate. To vary the Q-level and/or C-level, a different composition is chosen for the composite search results. In an embodiment, before actually constructing the composite search results, its composition may be decided upon according to the desired range of values for the Q-level and/or C-level.

In the process of finding the composition that results in a composite search result having a desired range of C-level and/or Q-level, the C-level and/or Q-level may be calculated for different possible composite search results (or, stated differently, for different compositions for the composite search results) until a possible composite search result is found having a C-level and/or Q-level within a desired range. This process of the calculation of different C-levels and/or Q-levels for different possible compositions may be referred to as varying the C-level and/or Q-level. Similarly, other types of manipulations of the possible composition of the composite search results may be referred to in terms of manipulations (such as maintaining a fixed value) of the value of the C-level and/or Q-level. For example, the two-step operation of (1) calculating the Q-level for different possible compositions of the composite search results, and (2) discarding any composite search results having a Q-level below a threshold, may be referred to as maintaining the Q-level at or above a threshold. Similarly, calculating the C-level for more than one possible composite search result and selecting the composite search result with the highest C-level may be referred to as increasing or as maximizing the C-level.

In an embodiment, a Q-level that is based on multiple sources of search results is maintained at or above a minimum threshold. Additionally, while maintaining the Q-level above a given threshold, the C-level associated with a set of possible composite search results is optimized.

In an embodiment, rather than maintaining a fixed threshold for the Q-level a tradeoff is allowed between the Q-level and the C-level. Specifically, the C-level is brought to a level that is more desirable than other possible levels (e.g., raised, lowered, or optimized) while maintaining an acceptable value of the Q-level (or one or more other values), but at least some tradeoff is allowed between lowering the acceptable level of the Q-level. In an embodiment, each of the C-level and the Q-level are assigned commercial values, and the total commercial value is optimized.

The invention is not limited to finding commercially more desirable combinations of search results. An optimization of a commercial value using a Q-metric and C-metric could also be applied to optimizing any combination of resources from different sources. For example, an optimization may be performed to determine an amount of space on a user interface for an e-mail mail box to devote to advertisements and how much to devote to listings of received e-mails. The methods and systems of this specification are applicable not only to search results, but to other resources. An optimization may be performed to determine an allocation of any set of resources from different sources (e.g., combinations of any type of information of multiple different varieties or from multiple different sources, and/or for optimizing the allocation of space on any webpage (such as a page related to an e-mail mail box, maps, or news) between commercial items (e.g., advertisements) and/or items a user is interested in viewing (e.g., e-mail messages, search results, or news)).

The invention is also not limited to a C-metric and a Q-metric or just having two metrics. The principles described in this application could be applied to other metrics and/or to having any number of metrics. For example, in addition to or instead of the C-metric and/or the Q-metric, an aesthetic metric or a market share metric may be included that quantifies how aesthetically pleasing the page looks.

The C-level and the Q-level are just two examples of attribute values. Thus, in an embodiment, a plurality of expected attribute values (which may be referred to as estimated attribute values) may be associated with a composite search result. The amount of search results selected from each source candidate is varied, thereby changing the attribute values. A composite search result is selected from the possible variations based on the expected attribute values associated with the possible variations. In an embodiment the one of the attribute values is maintained above, below, or at a threshold level, while the variation chosen is as the composite search results has a value that is more desirable than the other possibilities considered. A more desirable value for the attribute value may be a greater value, a lower value, or a value closer to a desired value. The more desirable value may be a value obtained through an optimization, minimization, maximization, or extremization process.

The composite search results may be presented in a fashion such that the source of any given portion of the information is not apparent to the viewer or user. Similarly, it may not be apparent to the user which information originates from a commercial source and which originates from a noncommercial source. Alternatively, the composite search results may be presented such that the source or type of source (e.g., commercial or noncommercial) of each search result candidates or other piece of information is apparent.

Although the description that follows uses the example of a search, the same principles may be applied to optimizing the allocation of information from multiple different sources and/or of multiple different types. Similarly, the allocation of space on web pages between advertisements or other commercially valuable displays and/or other items desired to be viewed by the user could be optimized by similar techniques, for example.

The Overall Search System

FIG. 1 shows a search system 100, which includes user 102, network 104, primary search engine 106, secondary search engine 108, other search engine 110, database of primary search engine 112, database of secondary search engine 114, database of other search engine 116, other databases 118*a-o*, query 152, composite search results 154, search results candidate 156, search results candidate 158, and search results candidate 160. Other embodiments of the search system 100 may have other components in addition to those listed above, may not have all of the components listed above, and/or may have other arrangements than the one depicted in FIG. 1.

User 102 accesses network 104 via a personal computer or other Internet appliance. Some examples of other Internet appliances are mainframe computers, workstations, terminals, handheld computing devices, web TVs, and any other item or appliance that has or that is enhanced to have web access such as a telephone, a camera, or even an electronic book.

Network 104 could be the Internet, another Wide Area Network (WAN), or a Local Area Network (LAN). Primary search engine 106 could be a search engine provided by an Internet Service Provider (ISP), such as for example Yahoo! or AT&T. Secondary search engine 108 may be a provider of links for related commercial websites, such as Overture.

Other search engine 110 may be any other search engine such as Google or AT&T. The difference between primary search engine 106 and other search engine 110 may be only which one the user decided to use for entering the search. Although only two secondary search engines, secondary search engine 108 and other search engine 110, are shown in FIG. 1, there may be any number of secondary search engines.

Optionally, primary search engine 106 may have a database associated with it, represented by database of primary search engine 112. Optionally, secondary search engine 108 may have a database associated with it, represented by database of secondary search engine 114. Optionally, other search engine 110 may have a database associated with it, represented by database of primary other engine 116. Although direct connections are illustrated in FIG. 1, any one of or any combination of database of primary search engine 112, database of secondary search engine 114, and database of other search engine 116 may be connected to their respective search engines via network 104. Alternatively, any one of or any combination of database of primary search engine 112, database of secondary search engine 114, and database of other search engine 116 may have some parts connected to their respective search engines via network 104 and other parts connected directly to their respective search engines.

Other databases 118a-o is a collection of several databases, which may include a mixture of academic links, sponsored results and/or other data, and may include websites of individuals and non-profit organizations, and/or databases of Universities and other public databases, for example. Other databases 118a-o may include commercial websites of companies such as Amazon.com, Barnes & Noble, and Invitations on Line. There may be any number of databases in each of other databases 118a-o. Each of the other databases 118a-o may include their own servers and/or search engines. Some of the databases of other databases 118a-o may be accessible only via primary search engine 106, secondary search engine 108, and/or other search engine 110. Any combination of databases 118a-o may be connected, directly and/or via network 104, to one another.

When conducting a search, user 102 via, for example, a browser enters a search query into a search window of a web page of primary search engine 106. Primary search engine 106 may search other databases 118a-o. Additionally, primary search engine 106 may perform searches on database of primary search engine 112, database of secondary search engine 114, and/or database of other search engine 116 and/or receive search results from secondary search engine 108, other search engine 110, and/or other search engines.

Query 152 is the query sent from user 102 to primary search engine 106. Composite search results 154 are the search results returned by primary search engine 106 as an answer to query 152. Candidate search results 155, 156, 158, and 160 are search results provided by candidate sources including database of primary search engine 112, secondary search engine 108, other search engine 110, and other databases 118a-o, respectively. Any combination of candidate search results 155, 156, 158, and 160 may represent a multiplicity of search result candidates from a corresponding multiplicity of candidate sources. Primary search engine 106 determines an amount of search results from candidate search results 155, 156, 158, and 160 to provide to user 102, and returns a composite of different and/or equal amounts of candidate search results 155, 156, 158, and 160 as composite search results 154.

The Arrangement of the Search Results

Figure 2:
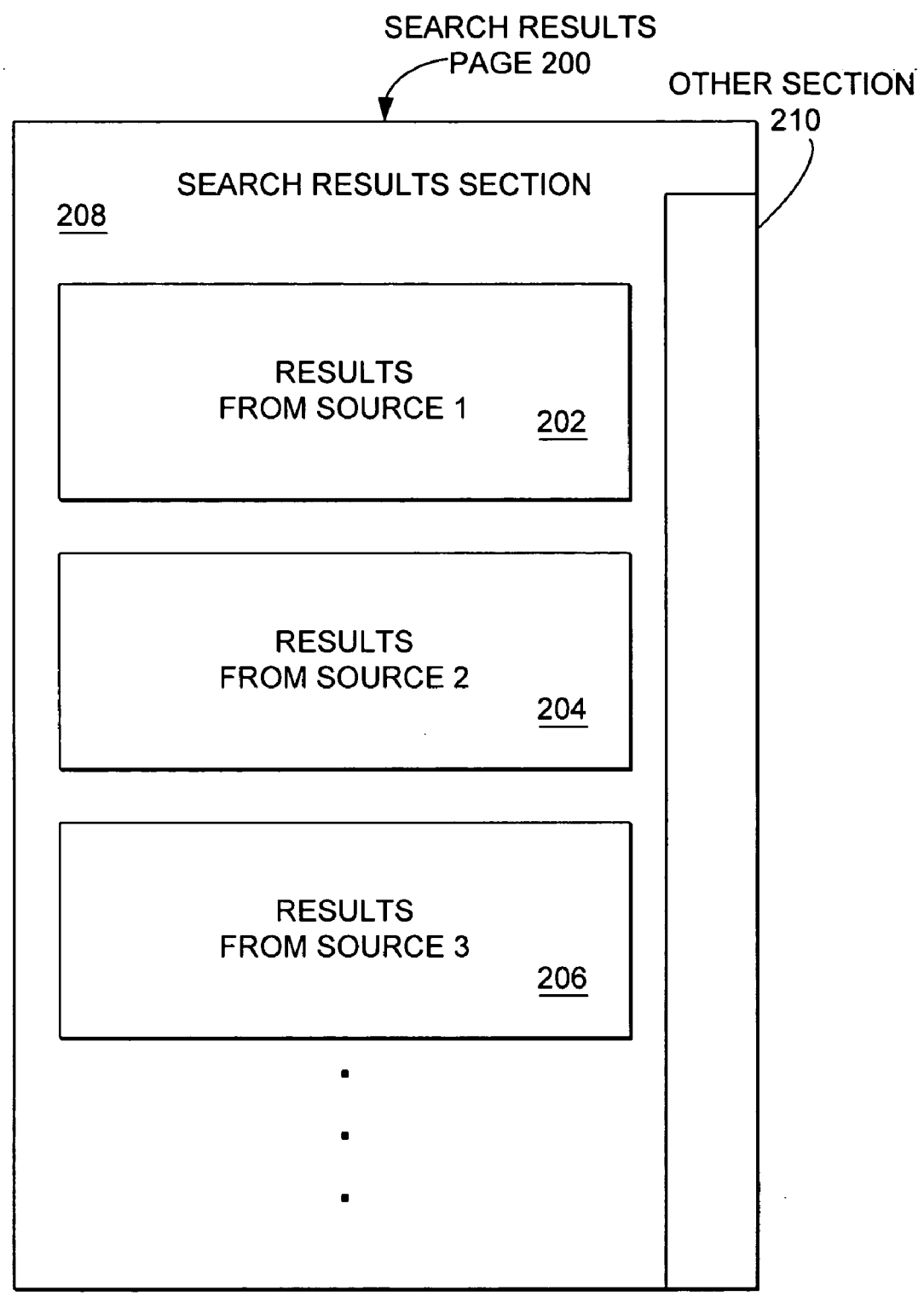
FIG. 2 shows a diagram of a search results page.

FIG. 2 shows search results page 200, which includes the results from source 1 (202), results from source 2 (204) and results from source 3 (206). In the example of FIG. 2, search results page 200 is also divided into search results section 208 and other section 210. Other embodiments of search results page 200 may have other components in addition to those listed above, may not have all of the components listed above, and/or may have other arrangements than the one depicted in FIG. 2.

Results page 200 is an example of composite search results 154 (FIG. 1). Although illustrated as different regions, results from source 1 (202), results from source 2 (204), and results from source 3 (206) may not necessarily be in different regions. Results from source 1 (202) may be the search results from commercial secondary search engine 108, and selected from candidate search results 156, for example. Results from source 2 (204) may be selected from candidate search results 160 of primary search engine 106 derived from a search performed directly on one or more of other databases 118a-o. Alternatively, results from source 2 (204) may be search results from a search performed on a database (e.g., database of primary search engine 112) available exclusively via an ISP associated with primary search engine 106, such as candidate search results 155, in addition to or instead of the search results from one or more of database of secondary search engine 114, database of other search engine 116, and other databases 118a-o. An example of results from source 2 (204) (e.g., candidate search results 155) is the search results displayed as "Inside Yahoo!" on the Yahoo! search results page when performing a search with Yahoo!. Results from source 3 (206) may be candidate search results 160, which are search results from other secondary search engine 110.

In an embodiment, each of results from source 1 (202), results from source 2 (204), and results from source 3 (206) are placed on a search results page in distinctly different regions so that it is visually clear that they are from different sources and/or are of different types of results. In an embodiment, results from source 1 (202), results from source 2 (204), and results from source 3 (206) may be in different regions that are not visually distinct, but that are nonetheless logically distinct. Alternatively, results from source 1 (202), results from source 2 (204), and results from source 3 (206) may be mixed together, but nonetheless labeled so that their sources, or the types of source from which they originate, are clear. Optionally, the mixture of results from different sources may be ordered according to a ranking that takes into account each listing's commercial value, quality value, relevance to the search, and/or other measures of the listing's relevance. In other embodiments, the type of source from which the results originate may not be identified or be identifiable.

In an embodiment, search results page 200 is additionally divided into search results section 208 for displaying search results and other section 210 for displaying other items, such as advertisements. Alternatively, search results page 200 displays only search results, does not include any other items, and does not include other section 210. Although only two sections are illustrated in FIG. 2, search results page 200 may be divided into any number of sections for displaying different types or categories of items. Although results section 208 and other section 210 are displayed as contiguous, they may be inter-dispersed within one another.

Use of the Q-Metric, C-Metric, and Other Metrics

A weighting is assigned to each of the results from source 1 (202), results from source 2 (204), and results from source 3 (206) according to how much user satisfaction is expected the user will obtain by getting more results from each of source 1, source 2 and source 3, respectively. In an embodiment, the weighting associated with each source is different for each search term. For example, if for a particular query term source 3 is generally expected to give greater user satisfaction than source 2, then the Q-metric associated with source 3 may be given a weight of for example 0.7 while the weight associated with source 2 may only be 0.5. If source 1 is, for example, a commercial secondary search engine 108, for a given query term, such as elephant, which is not expected to be commercial in nature, it may be expected that the user does not want to view very many results from source 1 and the weighting assigned to results from source 1 may be 0.1, for example. Similarly, weightings may be assigned to the areas in results section 208, other section 210, and any other sections or to any other allocation of other resources among different types of usages or to different types of sources.

The Q-metric, the C-metric, and any other metrics may be a combined Q-metric, combined C-metric, and combined other metric respectively, that are each weighted sums of individual Q-metrics, C-metrics, and other metrics taken from all of the various sources. The Q-metric, C-metric, and other metrics may be tables tabulating the expected user satisfaction commercial benefit, and other benefits respectively, as a function of the number of different types of links, search result candidates, or other resources provided in a search result. In an embodiment, the Q-metric, the C-metric, and any other metrics may be updated relatively infrequently, such as once a month, once every 3 months, or once a year.

In alternative embodiments, the Q-metric, the C-metric, and any other metrics may be updated periodically at relatively frequent periods of time such as every second, every minute, every hour, every day, every time a new search is performed, and or every time a major event occurs affecting the lives of some or of numerous people, according to any algorithm, or at any other frequency, pattern, or set of times, for example. The Q-metric, C-metric, and/or any other metric may be updated globally or only in certain localities.

The Q-metric may be calculated on a word-by-word and/or term-by-term basis. Each word and/or term may have its own Q-metric, and an overall or composite Q-metric for a search may be obtained by calculating a function (e.g., a sum) of the individual Q-metrics. Alternatively, some or all search terms may be grouped into categories, and each category may be assigned a Q-metric. There may be any number of categories. For example, in an embodiment there may be just one category for all possible search terms. In an embodiment, the Q-metric may be calculated over a sampling or over a total of all search terms for a given time period. In an embodiment the Q-metric may be different depending upon the purchasing history, previous search history, and/or residence of the searcher entering the search, for example.

There are many other methods for determining the Q-metric. For example an explicit vote algorithm may be utilized for determining the Q-metric in which a sample of users are surveyed regarding whether they like or do not like a particular search result page, which is provided in response to a particular search query. The Q-metric may be determined using a side-by-side comparison in which a sample of users are asked to rank the desirability of two or more search result pages that correspond to the same search query. The Q-metric may be determined using an implicit vote algorithm in which the response (e.g., the click through rates) of different users to different search pages and/or different links are compared. The Q-metric may be determined using an implicit interleaved algorithm in which alternating sponsored and unsponsored search results "interleaved" on one search results page, and the click through rates associated with each link is recorded. The Q-metric may also be determined using a function that combines results of several different methods of determining the Q-metric.

The individual Q-metrics for each source may be measured by how often users click in that results section and may also be measured by how long the user views the document selected after clicking on a link in that section. The individual Q-metrics may be based upon inputs other than CTR, such as whether the user makes a purchase.

For example, the Q-level may be calculated from the equation $$Q\text{-level}=Q\text{-level}_1 w_1+Q\text{-level}_2 w_2+Q\text{-level}_3 w_3,$$

where $Q\text{-level}_1$, $Q\text{-level}_2$, $Q\text{-level}_3$ are the Q-levels associated with sources 1, 2, and 3, respectively, and $w_1$, $w_2$, and $w_3$ are the weights associated with sources 1, 2, and 3. As another example, $$Q\text{-level}=CTR_1+CTR_2\alpha+CTR_3\beta,$$

where $CTR_1$, $CTR_2$, $CTR_3$ are the CTRs associated with sources 1, 2, and 3, respectively, and $w_1=1$, $w_2=\alpha$, and $w_3=\beta$ are the weights associated with sources 1, 2, and 3. Since, only the relative weights of $w_1$, $w_2$, and $w_3$ with respect to one another matter, one of the weights may be set to an arbitrary value (e.g., $w_1=1$) as long as the ratios of $w_1$, $w_2$, and $w_3$ to one another reflect the relative importance of sources 1, 2, and 3 in determining the overall Q-level. Similar equations may be used for calculating the combined Q-metric.

Similarly, the C-metric and C-level may be calculated from the equation $$C\text{-level}=C\text{-level}_1 y_1+C\text{-level}_2 y_2+C\text{-level}_3 y_3,$$

where $C\text{-level}_1$, $C\text{-level}_2$, $C\text{-level}_3$ are the C-levels associated with sources 1, 2, and 3, respectively, and $y_1$, $y_2$, and $y_3$ are the weights associated with sources 1, 2, and 3. As another example, $$C\text{-level}=C\text{-level}_1+C\text{-level}_2\gamma+C\text{-level}_3\delta,$$

where $y_1=1$, $y_2=\gamma$, and $y_3=\delta$ are the weights associated with sources 1, 2, and 3. Again, since only the relative weights of $y_1$, $y_2$, and $y_3$ with respect to one another matter, one of the weights may be set to an arbitrary value (e.g., $y_1=1$) as long as the ratios of $y_1$, $y_2$, and $y_3$ to one another reflect the relative importance of sources 1, 2, and 3 in determining the overall C-level. Similar equations may be used for calculating the combined Q-metric and/or any other metrics.

In an embodiment, the ratio of the values of $w_1$, $w_2$, and $w_3$, or of $\alpha$, and $\beta$ may be adjusted according to the C-level of the search query. Similarly, in an embodiment, the ratio of the values of $y_1$, $y_2$, and $y_3$, or $\gamma$ and $\delta$ and/or of any other set of weights for any other metric may be adjusted according to the search query. Levels or values associated with other metrics may be calculated in an analogous fashion as the Q-level and C-level.

Although in the example above a weighted sum is used to calculate the Q-level and C-level, other functions could be used instead. For example, instead of a weighted sum the level of the metric may be calculated according to one of equations $$M\text{-level}=[(M\text{-level}_1 y_1)^2+(M\text{-level}_2 y_2)^2+(M\text{-level}_3 y_3)^2]^{1/2},$$

$$M\text{-level}=\log\,[\exp(M\text{-level}_1 y_1)+\exp(M\text{-level}_2 y_2)+\exp(M\text{-level}_3 y_3)],\text{ or}$$

$$M\text{-level}=(M\text{-level}_1)^{\hat{}}y_1+(M\text{-level}_2)^{\hat{}}y_2+(M\text{-level}_3)^{\hat{}}y_3,$$

or any other equation, where M-level is the level associated with any metric M, such as the Q-level or C-level, and $(M\text{-level}_i)^{\hat{}}y_i$ is used to indicate that $M\text{-level}_i$ is raised to the power $y_i$.

In an embodiment, iterative and/or multivariable techniques may be used to find the optimum combined C-level or other value of interest subject to the constraint that the Q-level be maintained above a minimum value, $Q_{min}$, and/or that a level associated with any number of other metrics be maintained above minimum values. Alternatively, a tradeoff may be allowed in which the $Q_{min}$ and/or other metrics are allowed to be lowered in exchange for a more optimal or higher C-level or other values of interest. In an embodiment, the Q-level, C-level and any other level may be assigned or associated with a commercial value, and the commercial value is optimized. In an embodiment, the commercial value may be any one of or any combination or profits, gross revenue, market share, name recognition, and/or brand recognition of a particular product, for example.

A variety of techniques may be used to optimize the C-level and/or the commercial value. For example, an extremization process may be used, which may involve maximizing or minimizing a function of interest such as the commercial value and/or a function of the Q-level, C-level, other level, and/or commercial value. The extremization process may involve taking derivatives of the function of interest with respect to the number of listings provided from each source, and setting the derivatives equal to zero to solve for the number of listings from each source, for example. Alternatively, a Lagrangian multiplier technique in which Q-level=$Q_{min}$, and/or a similar equation for any other metric, is used as the one or more constraint equations.

Another embodiment may involve calculating the C-level, Q-level, another level, commercial value and/or any other value of interest for all combinations of numbers of listings from different sources (or other allocation of other resources to usages by different sources) and comparing the results, especially if the number of different combinations of numbers of listings of interest are relatively few and/or the necessary calculations may be performed fast enough so that the user does not notice or does not get significantly annoyed. In an embodiment, a number of values of the function of interest may be calculated in order to bracket or approximately bracket the optimum value within a certain range of combinations of numbers of the different type of listings. Once the optimum combination has been bracketed, combinations within the range may be tried in order to further bracket the optimum combination of listings until an optimum combination is found. Alternatively, trial and error-like techniques or a myriad of other techniques may be used. The optimum value found of the C-level or any other level may be one of a range of values within a set tolerance. The optimum value found for the C-level or any other level may be one that is most optimal for a set possible composite search results being considered (e.g., combinations of listings or other resources or search results selected from search result candidates). The set of possible composite search results being considered may be a subset of possible composite search results for which a plurality of expected attributes were calculated. The subset may include those possible composite search results that satisfy certain conditions, such as an expected attribute value being below or being above a certain threshold.

In an embodiment, the C-metric may simply have just two values. For example, the C-metric may have a value of 1 if the search term is determined to be commercial and a value of 0 if the C-metric is determined to be noncommercial. In this embodiment, the number of sponsored results provided is maximized, while taking into account the Q-level calculated based on all of results from source 1 (204), results from source 2 (206), and results from source 3 (206). Optionally the Q-metric may be kept above a threshold value. In an alternative embodiment, the C-metric may have a spectrum of values depending upon how likely the search appears to be of a commercial nature.

Additionally, a C-metric, a Q-metric, and/or other metric may be used to determine the number and/or the order (or sequence) of the search results that are provided in search section 208 and the number of other items provided in other section 210 or used to determine another allocation of resources. Additionally, a C-metric, a Q-metric, and/or other metric may be used to determine the percentage of the web page that is allocated to search section 208 and the percentage of the web page that is allocated to other section 210.

Hardware Overview

Figure 3:
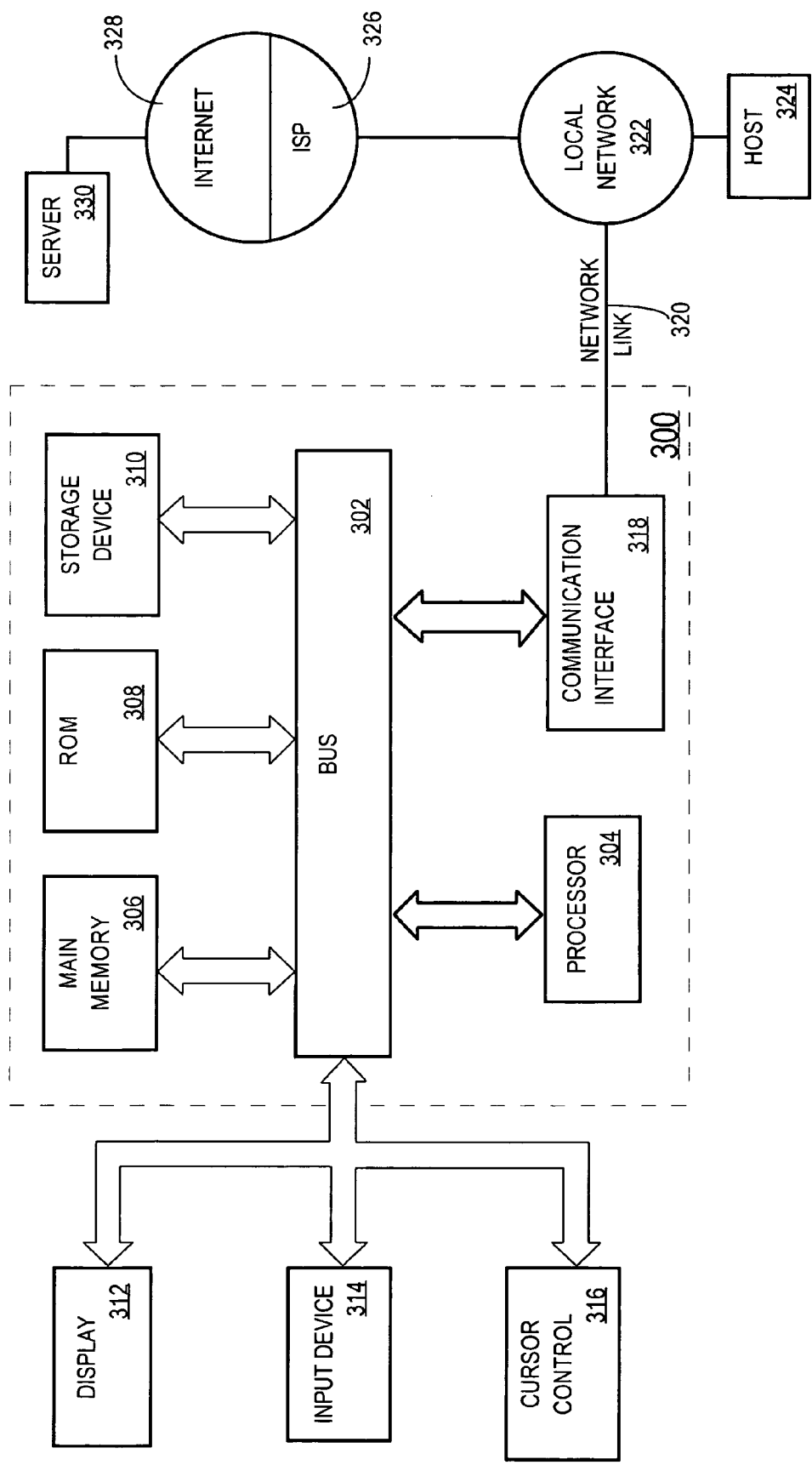
FIG. 3 shows a block diagram of a computer system used by the user, databases, and/or search engines of FIG. 1.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing primary search engine 106, commercial secondary search engine 108, other secondary search engine 110, commercial databases 116, other databases 112a-n, academic databases 114a-m, commercial databases 116a-o, and/or as a server for one or more commercial databases 116, other databases 112a-n, academic databases 114a-m, and/or commercial databases 116a-o. According to one embodiment of the invention, the search results page 200 is optimized and provided by computer system 300, running primary search engine 110, in response to processor 304 executing one or more sequences of one or more instructions contained in main memory 306. Such instructions may be read into main memory 306 from another computer-readable medium, such as storage device 310. Search results page 200 may displayed on display 312 of a compute system similar to computer system 300 being operated by user 102. Similarly user 102 may use the input device 314 of a computer system similar to computer system 300 to enter the search query.

Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for optimizing and presenting search results page 200, as described herein. Also, the instructions for carrying out the method described above may be stored on any of the computer readable mediums of computer system 300.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
receiving a query;
receiving a plurality of items from a plurality of candidate sources;
generating an initial set of possible composite search results, each of which is a different composition of items from the plurality of candidate sources;
determining a first estimated attribute value and a second estimated attribute value for each possible composite search result in the initial set of possible composite search results;
filtering the initial set of possible composite search results based upon whether the first estimated attribute value satisfies a specified threshold value to generate a filtered set;
selecting a final composite search result from the filtered set where the second estimated attribute value is greatest; and
providing for display at a client the final composite search result as the answer to said query,
wherein one of the estimated attribute values is a commercial value and the other estimated attribute value is a user satisfaction value, and
wherein the method is performed by one or more computing devices.

2. The method of claim 1, wherein the first estimated attribute value satisfies a first specified threshold when the first estimated attribute value is less than the threshold value.

3. The method of claim 1, wherein the first estimated attribute value satisfies a first specified threshold when the first estimated attribute value is greater than the threshold value.

4. A computer-readable storage medium storing one or more sequences of instructions which, when executed by one or more processors, cause the one or more processors to perform the method recited in claim 1.

5. A computer-readable storage medium storing one or more sequences of instructions which, when executed by one or more processors, cause the one or more processors to perform the method recited in claim 2.

6. A computer-readable storage medium storing one or more sequences of instructions which, when executed by one or more processors, cause the one or more processors to perform the method recited in claim 3.

7. The method of claim 1, wherein the final composite search result is displayed with results from different candidate sources integrated and the candidate source for each item labeled.

8. The method of claim 1, wherein the final composite search result is displayed without identifying the candidate source for each item.

9. The method of claim 1, wherein each estimated attribute value is determined on a term-by-term basis.

10. The method of claim 1, wherein one of the estimated attribute values is calculated based upon whether a user makes a purchase.

11. The method of claim 1, wherein an extremization process is used to optimize an at least one of the estimated attribute values, wherein the extremization process maximizes or minimizes a function of the estimated attribute.

12. A computer-readable storage medium storing one or more sequences of instructions which, when executed by one or more processors, cause the one or more processors to perform the method recited in claim 7.

13. A computer-readable storage medium storing one or more sequences of instructions which, when executed by one or more processors, cause the one or more processors to perform the method recited in claim 8.

14. A computer-readable storage medium storing one or more sequences of instructions which, when executed by one or more processors, cause the one or more processors to perform the method recited in claim 9.

15. A computer-readable storage medium storing one or more sequences of instructions which, when executed by one or more processors, cause the one or more processors to perform the method recited in claim 10.

16. A computer-readable storage medium storing one or more sequences of instructions which, when executed by one or more processors, cause the one or more processors to perform the method recited in claim 11.

17. The method of claim 1, wherein one of the estimated attribute values is associated with an estimated market share that is an estimated amount of sponsored items received.

18. The method of claim 1, wherein one of the estimated attribute values is associated with name recognition.

19. The method of claim 1, wherein one of the estimated attribute values is associated with a monetary value.

20. The method of claim 1, wherein the items comprise items that are sponsored by at least one of the plurality of candidate sources.

21. The method of claim 1, wherein filtering the initial set of composite search results further comprises determining whether the second estimated attribute value satisfies a second specified threshold;
    upon determining that the second estimated attribute satisfies a second specified threshold, adjusting the first specified threshold so that fewer composite search results are filtered.

22. A computer-readable storage medium storing one or more sequences of instructions which, when executed by one or more processors, cause the one or more processors to perform the method recited in claim 17.

23. A computer-readable storage medium storing one or more sequences of instructions which, when executed by one or more processors, cause the one or more processors to perform the method recited in claim 18.

24. A computer-readable storage medium storing one or more sequences of instructions which, when executed by one or more processors, cause the one or more processors to perform the method recited in claim 19.

25. A computer-readable storage medium storing one or more sequences of instructions which, when executed by one or more processors, cause the one or more processors to perform the method recited in claim 20.

26. A computer-readable storage medium storing one or more sequences of instructions which, when executed by one or more processors, cause the one or more processors to perform the method recited in claim 21.

27. A method comprising:
    receiving a query;
    receiving a plurality of items from a plurality of candidate sources;
    generating a plurality of item groups, each of which is a different composition of items from the plurality of candidate sources;
    determining a first estimated attribute value and a second estimated attribute value for each item group in the plurality of item groups;
    selecting a final item group from the plurality of item sets based upon first estimated attribute values and second estimated attribute values for each item group in the plurality of item groups; and
    providing, for display at a client, the final item group as an answer to said query,
    wherein one of the estimated attribute values is a commercial value and the other estimated attribute value is a quality value, and
    wherein the method is performed by one or more computing devices.

28. The method of claim 27, wherein a first item set of the plurality of item sets contains more items from a first candidate source of the plurality of candidate sources than items from a second candidate source of the plurality of candidate sources; and
    wherein a second item set of the plurality of item sets contains more items from the second candidate source than items from the first candidate source.

29. A computer-readable storage medium storing one or more sequences of instructions which, when executed by one or more processors, cause the one or more processors to perform the method recited in claim 27.

30. A computer-readable storage medium storing one or more sequences of instructions which, when executed by one or more processors, cause the one or more processors to perform the method recited in claim 28.

31. A method comprising:
    receiving a query;
    receiving, based upon the query, a plurality of items from a plurality of candidate sources;
    generating an initial set of item groups, where each item group in the initial set of item groups is a different composition of items from the plurality of candidate sources;
    determining a commercial value, that is a measure of the commercial nature of the query, and a quality value, that is an expected measure of customer satisfaction with the items, for each item group in the initial set of item groups;
    filtering the initial set of item groups based upon whether the quality value is greater than a specified threshold value to generate a filtered set;
    selecting a final item group from the filtered set where the commercial value is greatest; and
    providing, for display at a client, the final item group as an answer to said query,
    wherein the method is performed by one or more computing devices.

32. A computer-readable storage medium storing one or more sequences of instructions which, when executed by one or more processors, cause the one or more processors to perform the method recited in claim 31.

* * * * *

UNITED STATES PATENT AND TRADEMARK OFFICE
CERTIFICATE OF CORRECTION

| | |
|---|---|
| PATENT NO. | : 7,617,203 B2 |
| APPLICATION NO. | : 10/752742 |
| DATED | : November 10, 2009 |
| INVENTOR(S) | : Amr Awadallah et al. |

It is certified that error appears in the above-identified patent and that said Letters Patent is hereby corrected as shown below:

In the Claims:

Claim 11, column 15, line 5, between optimize and at, delete "an"

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,617,203 B2  Page 1 of 1
APPLICATION NO. : 10/752742
DATED : November 10, 2009
INVENTOR(S) : Awadallah et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 527 days.

Signed and Sealed this

Nineteenth Day of October, 2010

David J. Kappos
*Director of the United States Patent and Trademark Office*